H. J. DEISSNER.
Making Syrup from Corn.
No. 55,629. Patented June 19, 1866.
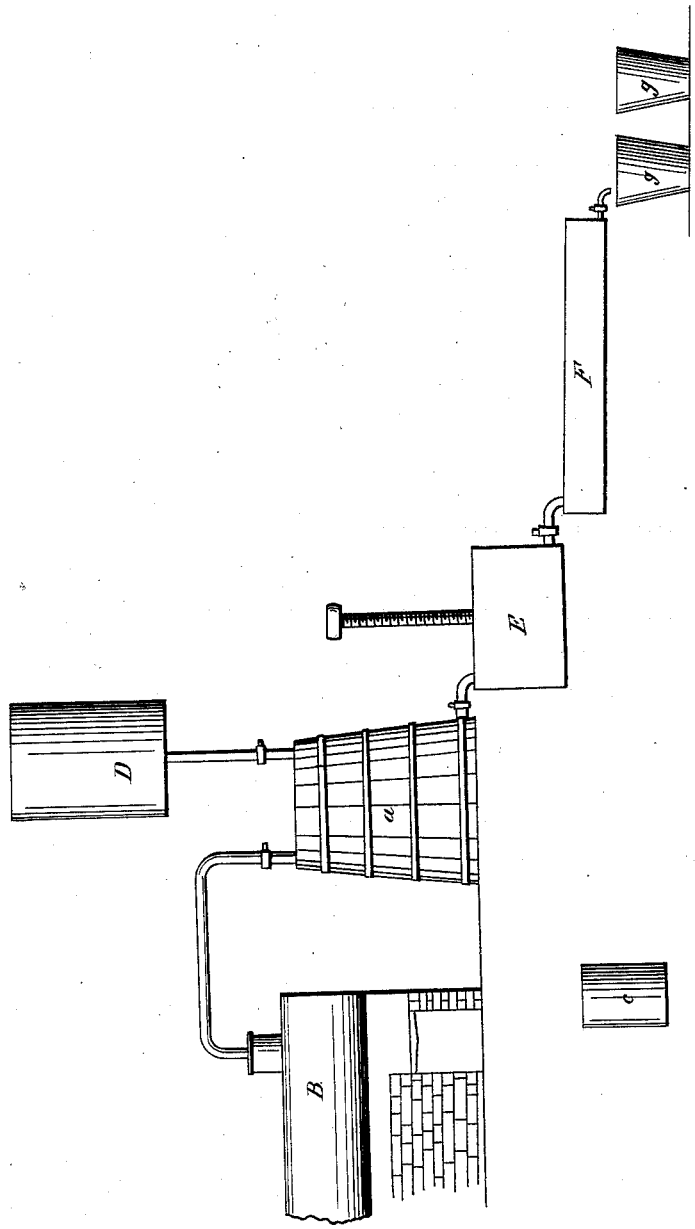
Witnesses:
Inventor:

UNITED STATES PATENT OFFICE.

H. J. DEISSNER, OF WAUKESHA, WISCONSIN.

IMPROVEMENT IN MAKING SIRUP FROM CORN.

Specification forming part of Letters Patent No. 55,629, dated June 19, 1866.

*To all whom it may concern:*

Be it known that I, H. J. DEISSNER, of Waukesha, Waukesha county, State of Wisconsin, have invented a new and Improved Process for Making Sirup from Corn; and I do hereby declare that the following is a full, clear, and exact description thereof, which will enable others skilled in the art to make and use the same.

The drawing represents a diagram of the apparatus which I use in carrying out my invention.

The invention relates to a process by which sirup can be made from corn in a cheap and easy manner and without the use of chemicals.

In carrying out my process I proceed as follows: Take a large still, $a$, pour in one and one-half barrel of water, heat it to 38° Reaumur by steam taken from the boiler B. Introduce fifteen pounds finely-ground barley-malt, two pounds of sugar, and five pounds of wheat-flour into the barrel $c$. Take eight gallons of the hot water from the still $a$, and mix the same well with the contents of the barrel $c$. Introduce six bushels of fine corn-meal into the still and heat by steam to 56° Reaumur while continually stirring. Then the steam is shut off and the mass is cooled, by means of cold water taken from the vat D, to 45° Reaumur, and the mass from the barrel $c$ is brought into the still $a$, and, while stirring, steam is admitted and the whole mass heated to 53°. Then the steam is shut off, the still $a$ is covered up, but not air-tight, and after half an hour the mass has cooled off to 50°, and it begins to be sweet. Steam is then again admitted and the mass heated to 53°, and kept so for about an hour, whereby its sweetness increases. The mass is then left to clear itself and the sweet liquor is drawn off into a press, E, which is provided with a large linen bag, and from the press it passes off quickly into the evaporator F. After this the thick portion of the mass is taken from the still and put into the press E and pressed quickly. After that two pounds of sugar are put into the evaporator, and the mass is stirred and boiled until all the gum has separated, which takes about two hours, and the saccharine liquid is drawn off into vats $g$ and left to clear itself, which takes but a short time. The clear sweet liquor is then taken from the vats $g$ and boiled down to a moderate consistency, and the fourteen pounds of sugar are added, and the result is eighteen gallons of sirup at ninety cents per gallon. The residue is mixed with the flour and malt in the subsequent operation, and the quantity of sugar required is reduced from fourteen pounds to twelve.

The residuum from the process may be used for distilling alcohol or as feed for cattle.

The cost of my process is as follows:

| | |
|---|---:|
| Corn, six bushels, at thirty cents | $1.80 |
| Flour and malt | .20 |
| Sugar | 3.24 |
| | $5.24 |
| And I obtain eighteen gallons of sirup, at ninety cents | 16.20 |
| Leaving a profit of | $11.00 |

The sirup or saccharine solution thus obtained may be used for making beer, for distillation, the making of vinegar, or the ordinary uses to which sirup proper is applied.

What I claim as new, and desire to secure by Letters Patent, is—

The within-described process of making sirup from corn by following the various manipulations which are specified.

The above specification of my invention signed by me this 13th day of February, 1866.

H. J. DEISSNER.

Witnesses:
M. M. LIVINGSTON,
W. HAUFF.